United States Patent [19]
Mori

[11] Patent Number: 5,383,820
[45] Date of Patent: Jan. 24, 1995

[54] CONTROL SYSTEM FOR AUTOMOTIVE AUTOMATIC TRANSMISSION

[75] Inventor: Akimasa Mori, Fuji, Japan

[73] Assignee: Jatco Corporation, Fujii, Japan

[21] Appl. No.: 52,738

[22] Filed: Apr. 27, 1993

[30] Foreign Application Priority Data

Apr. 28, 1992 [JP] Japan .................................. 4-136296

[51] Int. Cl.$^6$ .............................................. F16H 61/08
[52] U.S. Cl. ...................................... 475/123; 477/154
[58] Field of Search ........................ 475/128, 123, 122; 477/154

[56] References Cited

U.S. PATENT DOCUMENTS

| | | | |
|---|---|---|---|
| 3,823,621 | 7/1974 | Kubo et al. | 475/128 |
| 4,653,350 | 3/1987 | Downs et al. | 477/154 |
| 4,790,418 | 12/1988 | Brown et al. | 475/128 |
| 5,207,122 | 5/1993 | Minagawa | 475/123 |

Primary Examiner—Dirk Wright
Attorney, Agent, or Firm—Foley & Lardner

[57] ABSTRACT

A control system for controlling an automotive automatic transmission which comprises a friction element operated by a hydraulic pressure. The control system comprises a first device for judging whether a gear change of the transmission is necessary or not in accordance with the running condition of the vehicle; a second device for lowering the hydraulic pressure when the first device judges a necessity of the gear change; a third device for increasing the hydraulic pressure when a difference between the maximum engine speed appearing after starting of gear change operation and a current engine speed is greater than a predetermined degree; and a fourth device for increasing the hydraulic pressure when a predetermined time passes from the time when the first device has judged the necessity of the gear change irrespective of operation of the third device.

5 Claims, 6 Drawing Sheets

FIG. 2

| | | C18 | C20 | C22 | C24 | B28 | B26 | OWC 30 | OWC 29 | GEAR RATIO | α1 = 0.440<br>α2 = 0.493 |
|---|---|---|---|---|---|---|---|---|---|---|---|
| D RANGE | 1ST. SPEED | | | ○ | | | | ○ | ○ | $\frac{1+\alpha_2}{\alpha_2}$ | 3.027 |
| | 2ND. SPEED | | ○ | ○ | | ○ | | ○ | | $\frac{\alpha_1+\alpha_2+\alpha_1\alpha_2}{\alpha_2(1+\alpha_1)}$ | 1.619 |
| | 3RD. SPEED | | ○ | ○ | ○ | ○ | | ○ | | 1 | 1.000 |
| | 4TH. SPEED | | | (○) | ○ | | ○ | | | $\frac{1}{1+\alpha_1}$ | 0.694 |
| ENGINE BRAKE RUNNING STATE | 1ST. SPEED | | | (○) | ○ | ○ | ○ | (○) | (○) | | |
| | 2ND. SPEED | | ○ | (○) | ○ | | | (○) | | | |
| | 3RD. SPEED | | ○ | (○) | | ○ | | (○) | | | |
| | 4TH. SPEED | | | (○) | | ○ | ○ | | | | |
| REVERSE | | ○ | | | | | ○ | | | $-\frac{1}{\alpha_1}$ | -2.272 |

CONTROL SYSTEM FOR AUTOMOTIVE AUTOMATIC TRANSMISSION

BACKGROUND OF THE INVENTION

This application has relation to U.S. patent applications Ser. Nos. 07/795,989 (filed Nov. 22, 1991), 07/850,283 (filed Mar. 12, 1992), 07/878,469 (filed May 5, 1992), 07/939,600 (filed Sep. 2, 1992), and 07/969,072 (filed Oct. 30, 1992).

1. Field of the Invention

The present invention relates in general to automotive automatic transmissions, and more particularly to a control system for controlling the automotive automatic transmissions.

2. Description of the Prior Art

In order to improve the transmission performance of automotive automatic transmissions, a control has been hitherto proposed in which, during gear change operation, a hydraulic pressure applied to friction elements such as clutches or the like is stepwisely changed. That is, at an initial stage of the gear change operation, the hydraulic pressure is reduced for smoothing starting of engagement of the friction element, and thereafter, the hydraulic pressure is increased for shortening the period of the gear change operation, and at a final stage, the hydraulic pressure is reduced again for reducing a select shock produced upon completion of engagement of the friction element. That is, during the gear change operation, the hydraulic pressure for the friction element is temporarily increased. Increasing the hydraulic pressure starts when the engine speed is lowered from a maximum speed by a predetermined degree (for example, about 150 rpm). With this measure, the gear change operation is smoothly achieved in a shortened period.

However, due to its inherent construction, the above-mentioned conventional control is compelled to show a drawback when the vehicle speed is relatively low and/or any trouble occurs in the vehicle. That is, under such condition, it takes a long time to reduce the engine speed by the predetermined degree, and thus, completion of the gear change operation takes a considerably long time.

SUMMARY OF THE INVENTION

It is therefore an object of the present invention to provide a control system for an automotive automatic transmission, which is free of the above-mentioned drawback.

According to a first aspect of the present invention, there is provided a control system for controlling an automotive automatic transmission which has a friction element operated by a hydraulic pressure. The control system comprises first means for judging whether a gear change of the transmission is necessary or not in accordance with the running condition of the vehicle; second means for lowering the hydraulic pressure when the first means judges a necessity of the gear change; third means for increasing the hydraulic pressure when a difference between the maximum engine speed appearing after starting of gear change operation and a current engine speed is greater than a predetermined degree; and fourth means for increasing the hydraulic pressure when a predetermined time passes from the time when the first means has judged the necessity of the gear change irrespective of operation of the third means.

According to a second aspect of the present invention, there is provided a control system for controlling an automatic transmission powered by an engine, the transmission including a friction element operated by a hydraulic pressure. The control system comprises first means judging whether a gear change of the transmission is necessary or not in accordance with the running condition of the vehicle; second means for lowering the hydraulic pressure when the first means judges a necessity of the gear change; third means for judging whether a difference between the maximum engine speed appearing after starting of gear change operation and a current engine speed is greater than a predetermined degree or not; fourth means for judging whether or not a predetermined time passes from the time when the first means has judged the necessity of the gear change; fifth means for increasing the hydraulic pressure when the third means judges that the engine speed difference is greater than the predetermined degree or when the third means judges that the engine speed difference is smaller than the predetermined degree and the fourth means judges that the predetermined time has passed.

According to a third aspect of the present invention, there is provided a control system for use in an automotive automatic transmission including a friction element operated by a hydraulic pressure. The control system comprises first means for judging whether a gear change of the transmission is necessary or not by comparing a current operating condition of the transmission with a reference condition; second means for varying the hydraulic pressure in accordance with an information signal applied thereto; third means for detecting the engine speed; fourth means for judging whether or not the maximum engine speed appearing after the judgement of the first means is lowered by a predetermined degree; sixth means for judging whether or not a predetermined time passes from the time when the first means has judged the necessity of the gear change; and fifth means for causing the second means to raise the hydraulic pressure when the fourth means judges the lowering of the engine speed by the predetermined degree or when the sixth means judges the passing of the predetermined time.

BRIEF DESCRIPTION OF THE DRAWINGS

Other objects and advantages of the present invention will become apparent from the following description when taken in conjunction with the accompanying drawings, in which:

FIG. 2 is a TABLE showing ON/OFF (viz., engaged/disengaged) conditions of various friction elements of the automatic transmission with respect to various gear positions selected by the transmission;

DETAILED DESCRIPTION OF THE INVENTION

In the following, the present invention will be described in detail with reference to the accompanying drawings.

Figure 1:
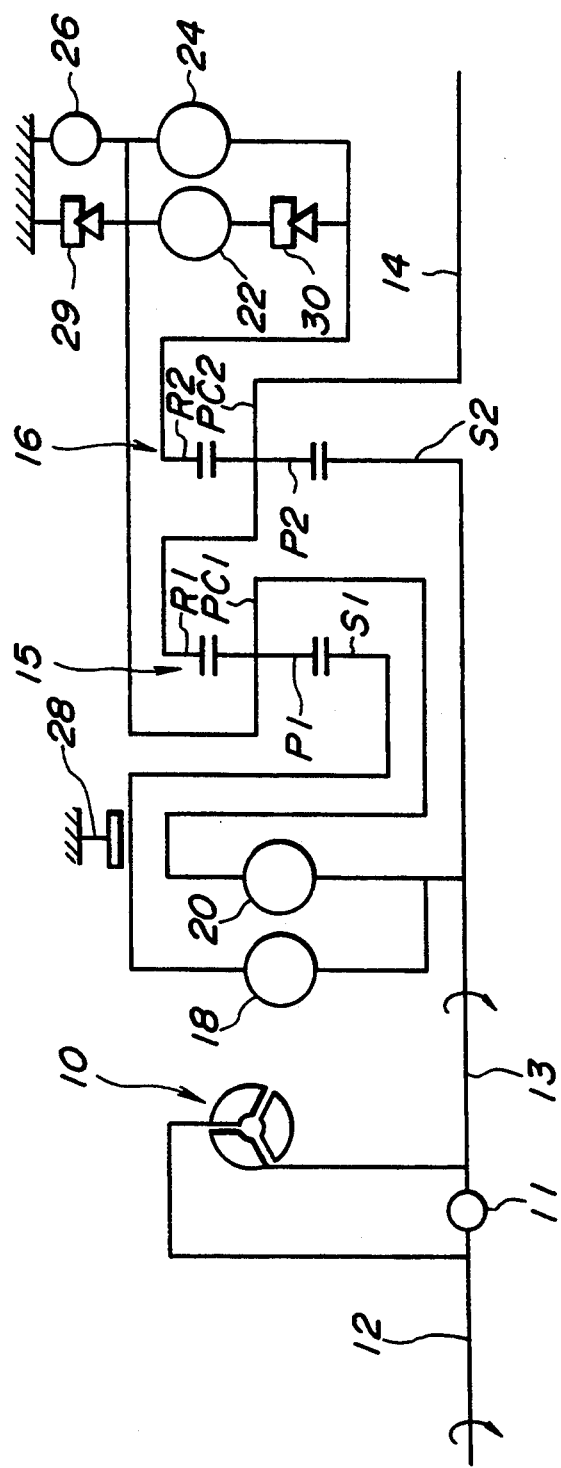
FIG. 1 is a schematic illustration of an automotive automatic transmission to which a control system of the present invention is applied.

In FIG. 1, there is schematically shown an automotive automatic transmission of a type which has four forward speeds (one being overdrive) and one reverse.

The transmission comprises an input shaft 13 to which a torque of an engine output shaft 12 is transmitted through a torque converter 10. Designated by numeral 14 is an output shaft of the transmission through which a driving force is fed to a final drive device (not shown).

Between the input and output shafts 13 and 14, there are disposed, in the illustrated manner, a first planetary gear unit 15, a second planetary gear unit 16, a reverse clutch 18, a high clutch 20, a forward clutch 22, an overrunning clutch 24, a low-and-reverse brake 26, a band brake 28, a low-oneway clutch 29 and a forward-oneway clutch 30.

The torque converter 10 has a lock-up clutch 11 installed therein.

The first planetary gear unit 15 comprises a sun gear S1, an internal gear R1, pinion gears P1 each meshing with both the sun gear S1 and the internal gear R1, and a pinion gear carrier PC1 carrying the pinion gears P1.

The pinion gear carrier PC1 is connectable to the input shaft 13 through the high clutch 20, and the sun gear S1 is connectable to the input shaft 13 through the reverse clutch 18.

The second planetary gear unit 16 comprises a sun gear S2, an internal gear R2, pinion gears P2 each meshing with both the sun gear S2 and the internal gear R2, and a pinion gear carrier PC2 carrying the pinion gears P2.

The pinion gear carrier PC1 of the first planetary gear unit 15 is connectable to the internal gear R2 of the second planetary gear unit 16 through the forward clutch 22 and the forward-oneway clutch 30 which are connected in tandem or through the overrunning clutch 24 which is arranged in parallel with the tandem connected clutches 22 and 30.

The sun gear R2 of the second planetary gear unit 16 is constantly connected with the input shaft 13, and the internal gear R1 of the first planetary gear unit 15 and the pinion gear carrier PC2 of the second planetary gear unit 16 are constantly connected with the output shaft 14.

The low-and-reverse brake 26 can fix the pinion gear carrier PC1 of the first planetary gear unit 15 and the band brake 28 can fix the sun gear S1 of the first planetary gear unit 15.

The low-oneway clutch 29 is so arranged as to permit only a normal rotation (viz., the rotation in the same direction as the engine output shaft 12) of the pinion gear carrier PC1 of the first planetary gear unit 15. That is, a reversed rotation of the pinion gear carrier PC1 is suppressed by the clutch 29.

By selectively engaging and disengaging the clutches 18, 20, 22, 24, 29 and 30 and the brakes 26 and 28 in various combinations, the elements (viz., S1, S2, R1, R2, PC1 and PC2) of the first and second planetary gear units 15 and 16 are forced to change their operating conditions. With this changing, the ratio of rotation speed of the output shaft 14 relative to that of the input shaft 13 can be variously changed.

FIG. 2 is a table showing the various gear positions (viz., first, second, third and fourth forward speeds and a reverse) which are given by the ON/OFF (viz., engaged/disengaged) conditions of the clutches 18, 20, 22, 24, 29 and 30 and the brakes 26 and 28.

In the table, the mark "0" means "ON" or engaged condition of the associated clutch or brake and "blank" means "OFF" or disengaged condition of the same. The mark "(O)" means that the engaged condition does not participate in power transmission in the established gear speed. It is to be noted "$\alpha 1$" or "$\alpha 2$" is a ratio of the number of teeth of the sun gear S1 or S2 relative to that of the internal gear R1 or R2, and the "GEAR RATIO" is the ratio of the rotation speed of the input shaft 13 relative to that of the output shaft 14.

Figure 3:
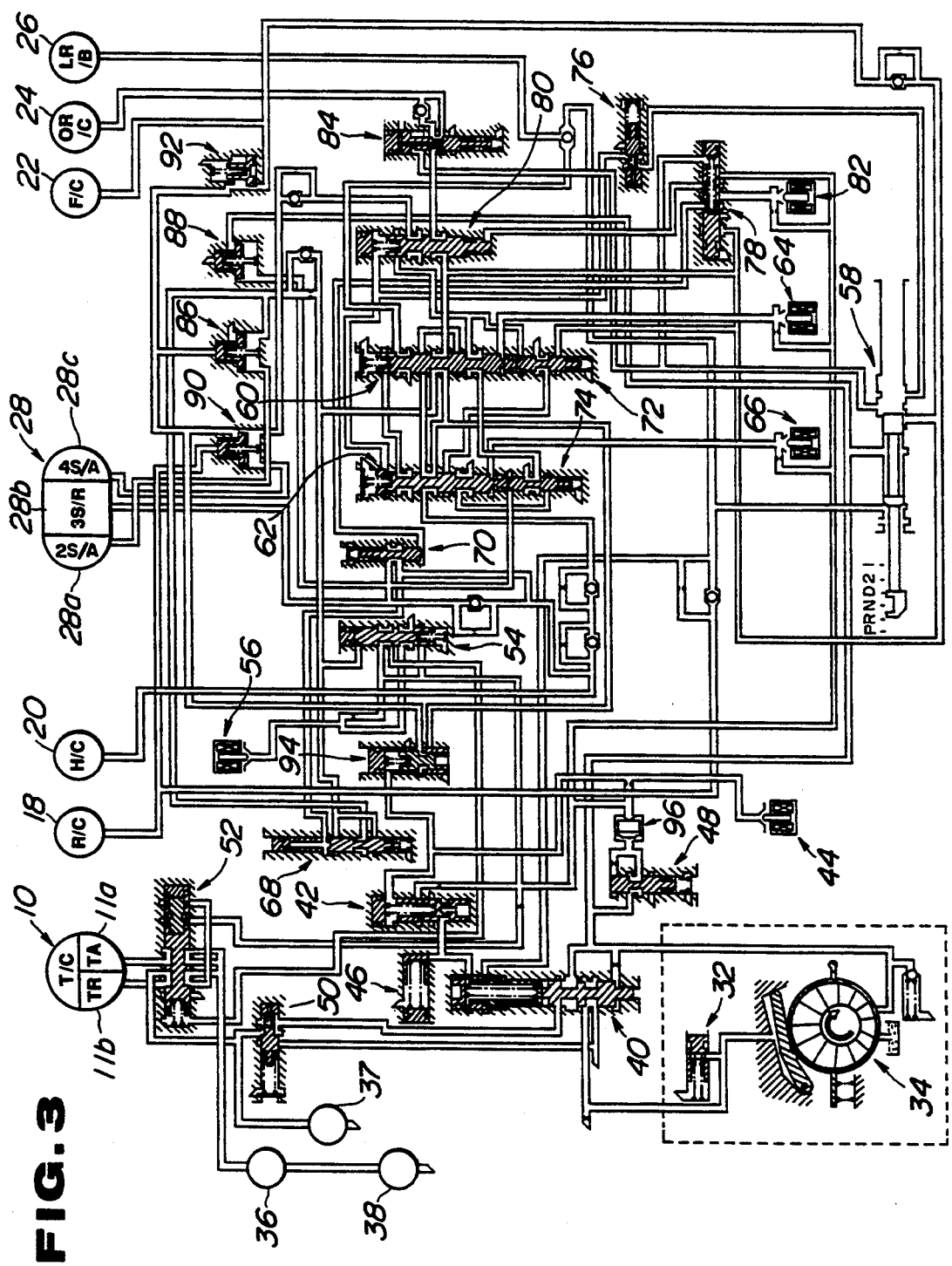
FIG. 3 is a schematic drawing of a hydraulic circuit of the automatic transmission.

FIG. 3 shows a hydraulic control circuit for controlling operation of the above-mentioned automatic transmission. The control circuit comprises a line pressure control valve 40, a pressure modifier valve 42, a line pressure control solenoid 44, a modified pressure accumulator 46, a pilot valve 48, a torque converter relief valve 50, a lock-up control valve 52, a first shuttle valve 54, a lock-up control solenoid 56, a manual valve 58, a first shift valve 60, a second shift valve 62, a first shift solenoid 64, a second shift solenoid 66, a servo-charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid (viz., engine brake controlling solenoid) 82, an overrunning clutch reducing valve 84, a 1-2 accumulator 86, a 2-3 accumulator 88, a 3-4 accumulator 90, a N-D accumulator 92, an accumulator control valve 94 and a filter 96. These elements are connected in such a manner as is shown in the drawing.

The torque converter 10 has therein pressure apply and release chambers 11a and 11b for the lock-up clutch 11. This torque converter 10, the forward clutch 22, the high clutch 20, the band brake 28, the reverse clutch 18, the low-and-reverse brake 26 and the overrunning clutch 24 are connected to the hydraulic control circuit in the illustrated manner. The band brake 28 has a pressure apply chamber 28a for the second speed, a pressure release chamber 28b for the third speed and a pressure apply chamber 28c for the fourth speed incorporated therewith.

An oil pump 34 of capacity variable vane type, an oil cooler 36, a front lubrication circuit 37 and a rear lubrication circuit 38 are connected in the illustrated manner. The oil pump 34 is equipped with a feedback accumulator 32.

The hydraulic control circuit of this type is described in detail in Japanese Patent First Provisional Publication No. 63-251652.

Figure 4:
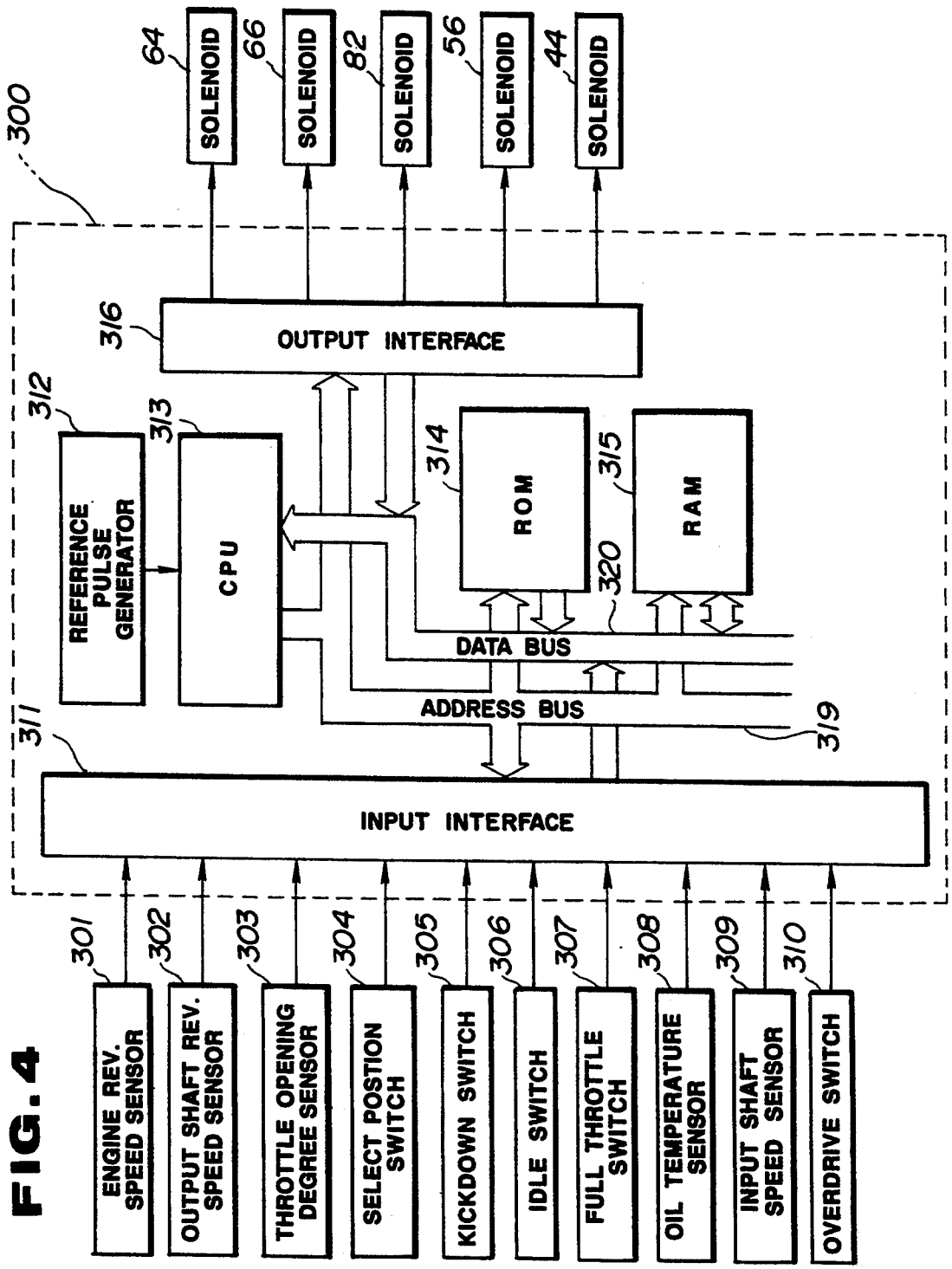
FIG. 4 is a schematic drawing of a control unit which constitutes an essential part of the control system of the present invention.

FIG. 4 shows schematically a control unit 300 which controls the operation of the solenoids 44, 56, 64, 66 and 82. As shown, the control unit 300 comprises an input interface 311, a reference pulse generator 312, a central processing unit (CPU) 313, a read only memory (ROM) 314, a random access memory (RAM) 315 and an output interface 316, an address bus 319 and a data bus 320.

Information signals from an engine speed sensor 301, a vehicle speed sensor 302, a throttle valve opening degree sensor 303, a select position switch 304, a kick down switch 305, an idle switch 306, a full throttle switch 307, an oil temperature switch 308, an input shaft speed sensor 309 and an over-drive switch 310 are fed to the control unit 300 through the input interface 311.

Instruction signals from the control unit 300 are fed through the output interface 316 to the shift solenoids 64 and 66, the overrunning clutch solenoid 82, the lock-up control solenoid 56 and the line pressure control solenoid 44.

Figure 5:
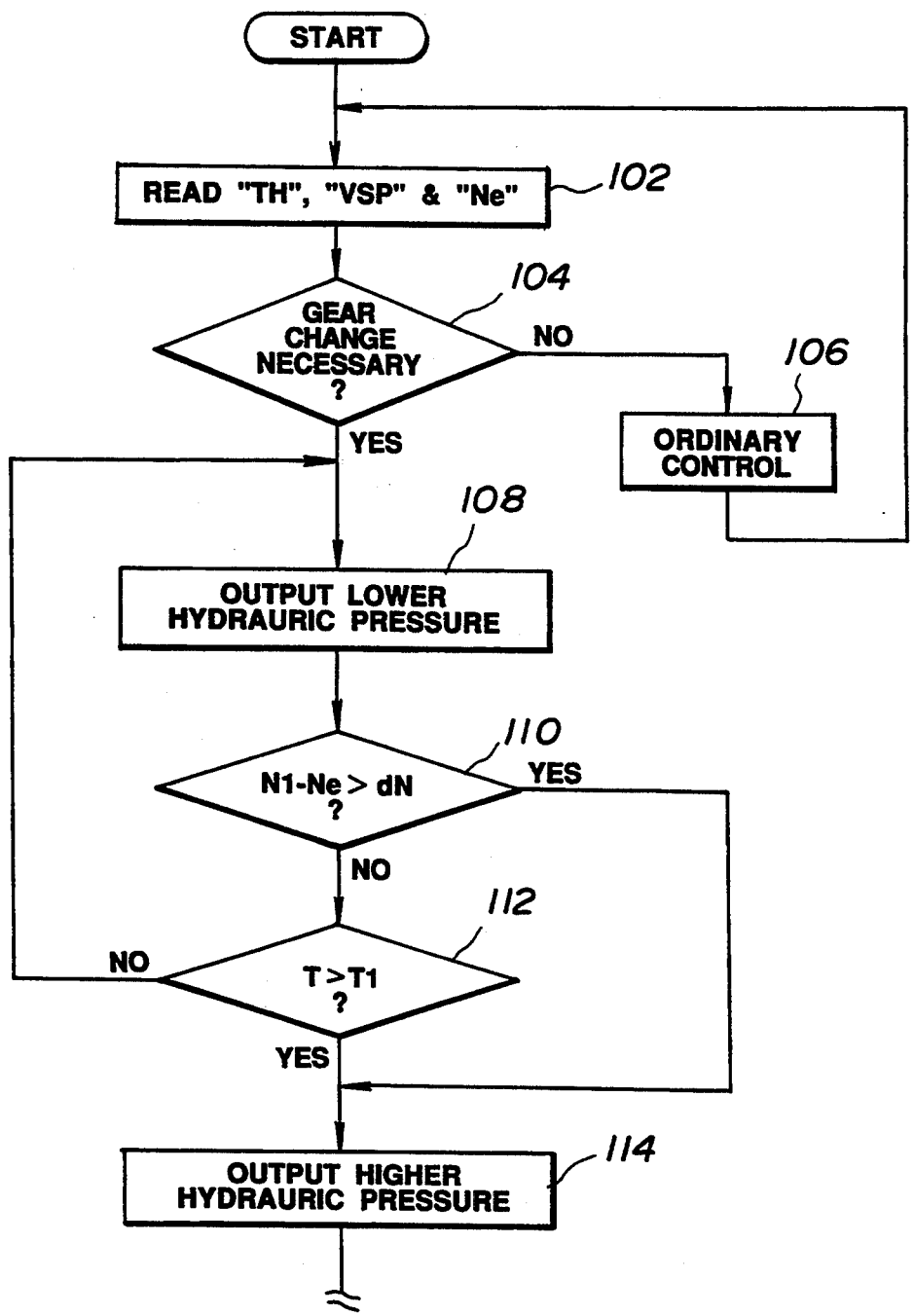
FIG. 5 is a flowchart showing programmed operation steps carried out in a computer of the control unit.

The control unit 300 controls the automatic transmission in such a manner as is depicted in the flowchart of FIG. 5.

That is, at step 102, the throttle valve opening degree (TH), the vehicle speed (VSP) and the engine speed (Ne) are read. Then, at step 104, by analyzing the throttle valve opening degree (TH) and the vehicle speed (VSP), a judgement is carried out as to whether a gear change is necessary or not. If "No", that is, when the gear change is judged unnecessary, the operation flow goes to step 106 wherein an ordinary control is carried out in the hydraulic circuit. While, if "Yes" at step 104, that is, when the gear change is judged necessary, the operation flow goes to step 108 wherein an instruction signal is issued for feeding the friction element with a lower hydraulic pressure appropriate for achieving a smoothed starting of engagement of the friction element. Then, the operation flow goes to step 110 wherein a judgement is carried out as to whether a difference between the maximum engine speed (N1) appearing after the starting of the gear change operation and the current engine speed (Ne) is greater than a predetermined degree (dN) or not. If "Yes", that is, when the difference is judged greater than the predetermined degree (dN), the operation flow goes to step 114 wherein another instruction signal is issued for feeding the friction element with a higher hydraulic pressure appropriate for shortening the period of the gear change operation. While, if "No" at step 110, that is, when the difference is judged smaller than the predetermined degree (dN), the operation flow goes to step 112 wherein a judgement is carried out as to whether the time "T" elapsed from the time when the "Yes" judgement on the gear change question has been made at step 104 is greater than a predetermined value "T1" or not. If "Yes", that is, when the elapsed time "T" is greater than the predetermined value "T1", the operation flows goes to step 114 wherein a higher hydraulic pressure is fed to the friction element. While, if "No" at step 112, that is, when the elapsed time "T" is smaller than the predetermined value "T1", the operation flow goes back to step 108.

As will be understood from the above, in the present invention, once a predetermined time "T1" has passed from the "Yes" judgement on the gear change question, an instruction signal for increasing the hydraulic pressure is issued irrespective of the engine speed "Ne". Of course, the increase of hydraulic pressure is also effected when the engine speed is lowered by a predetermined degree (dN). That is, even when the lowering of the engine speed is delayed, the increase of hydraulic pressure applied to the friction element assuredly takes place when the predetermined time "T1" has passed. Thus, the gear change operation is quickly and smoothly carried out.

Figure 6:
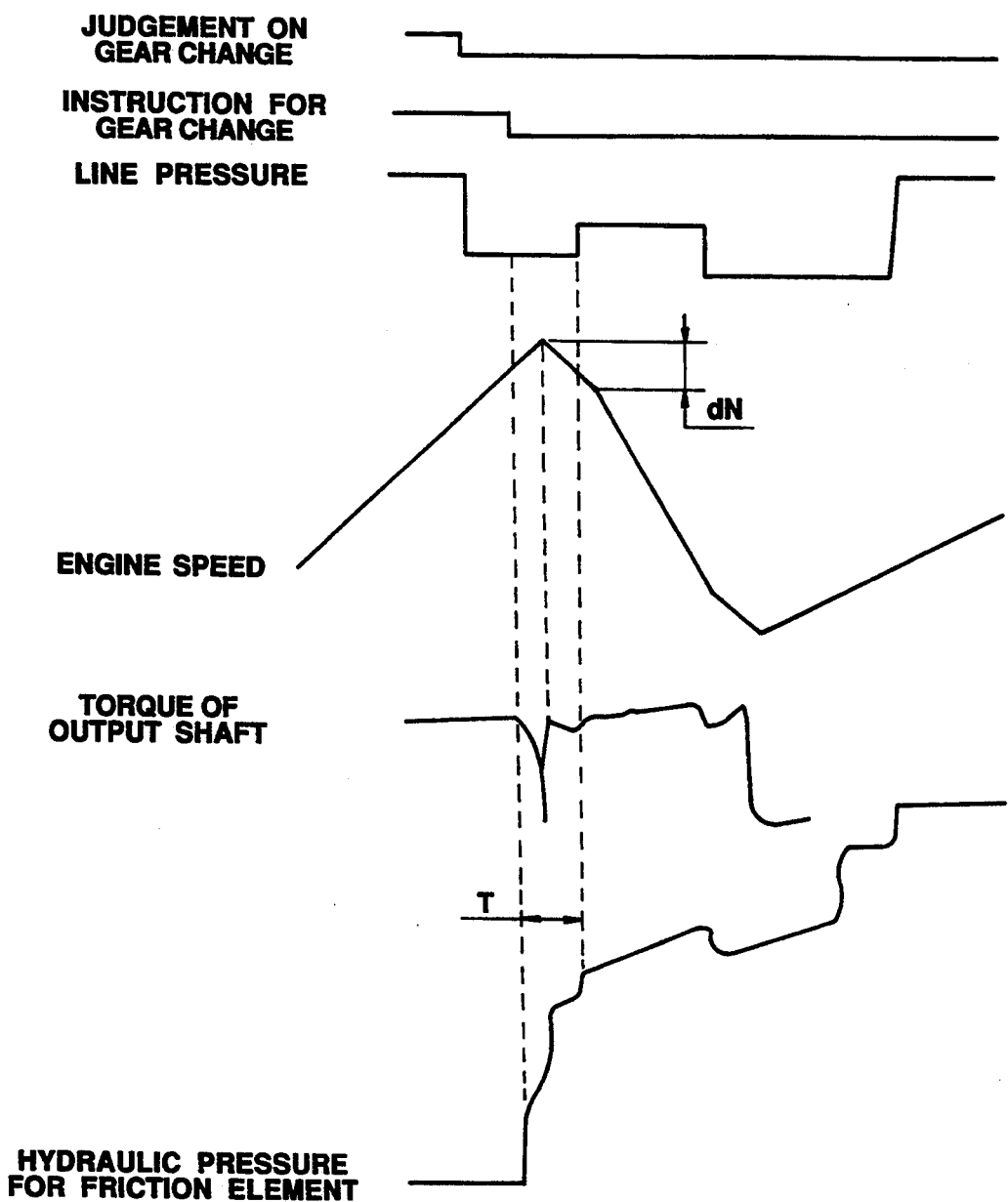
FIG. 6 is a graph showing various information signals and hydraulic pressure used and produced when the gear change is carried out.

FIG. 6 is a graph which shows changes of various factors with respect to elapsed time. As is seen from this graph, when a predetermined time "T1" has passed before the engine speed is reduced by a predetermined degree "dN", the increase of hydraulic pressure starts at the time when the predetermined time "T1" expires. The hydraulic pressure thus raised is reduced again at a final stage of the gear change operation. This reduction of hydraulic pressure may be effected based on the variation of engine speed or the elapsed time.

In the disclosed embodiment, the elapsed time "T" used at the step 112 is the time elapsed from the time when "Yes" judgement on the gear change question is actually made. However, if desired, the time "T" may be a time elapsed from the time when, upon the "Yes" judgement, an instruction signal is practically applied to gear change solenoids.

As will be understood from the foregoing description, in accordance with the present invention, when a predetermined time "T1" has passed from the "Yes" judgement on the gear change question, an instruction signal is issued for increasing the hydraulic pressure irrespective of the state of engine speed "Ne". Thus, even when the lowering of engine speed is delayed due to some reasons, the increase of hydraulic pressure for the friction element assuredly takes place at the expiration of the predetermined time "T1".

What is claimed is:

1. In an automotive automatic transmission including a friction element operated by a hydraulic pressure,
a control system comprising:
first means for judging whether a gear change of the transmission is necessary or not in accordance with the running condition of the vehicle;
second means for lowering said hydraulic pressure when said first means judges a necessity of the gear change;
third means for increasing said hydraulic pressure when a difference between the maximum engine speed appearing after starting of gear change operation and a current engine speed is greater than a predetermined degree; and
fourth means for increasing said hydraulic pressure when a predetermined time passes from the time when said first means has judged the necessity of said gear change irrespective of operation of said third means.

2. A control system as claimed in claim 1, further comprising fifth means which causes said hydraulic pressure to assume an ordinary state when said first means judges a non-necessity of the gear change.

3. In an automatic transmission powered by an engine, said transmission including a friction element operated by a hydraulic pressure,
a control system comprising:
first means judging whether a gear change of the transmission is necessary or not in accordance with the running condition of the vehicle;
second means for lowering said hydraulic pressure when said first means judges a necessity of the gear change;
third means for judging whether a difference between the maximum engine speed appearing after starting of gear change operation and a current engine speed is greater than a predetermined degree or not;
fourth means for judging whether or not a predetermined time passes from the time when said first means has judged the necessity of said gear change;
fifth means for increasing said hydraulic pressure when said third means judges that the engine speed difference is greater than the predetermined degree or when said third means judges that the engine speed difference is smaller than the predetermined degree and said fourth means judges that the predetermined time has passed.

4. A control system as claimed in claim 3, further comprising sixth means which causes said hydraulic pressure to assume an ordinary state when said first means judges a non-necessity of the gear change.

5. In an automotive automatic transmission including a friction element operated by a hydraulic pressure, a control system comprising:

first means for judging whether a gear change of the transmission is necessary or not by comparing a current operating condition of the transmission with a reference condition;

second means for varying said hydraulic pressure in accordance with an information signal applied thereto;

third means for detecting the engine speed;

fourth means for judging whether or not the maximum engine speed appearing after the judgement of said first means is lowered by a predetermined degree;

sixth means for judging whether or not a predetermined time passes from the time when said first means has judged the necessity of the gear change; and fifth means for causing said second means to raise said hydraulic pressure when said fourth means judges the lowering of the engine speed by the predetermined degree or when said sixth means judges the passing of said predetermined time.

* * * * *